(No Model.)

P. V. CONOVER.
SAW TOOTH.

No. 302,710. Patented July 29, 1884.

WITNESSES:
C. Neveux
C. Sedgwick

INVENTOR:
P. V. Conover
BY Munn & Co
ATTORNEYS.

UNITED STATES PATENT OFFICE.

PHILIP V. CONOVER, OF UVALDE, TEXAS.

SAW-TOOTH.

SPECIFICATION forming part of Letters Patent No. 302,710, dated July 29, 1884.

Application filed June 10, 1884. (No model.)

*To all whom it may concern:*

Be it known that I, PHILIP V. CONOVER, of Uvalde, in the county of Uvalde and State of Texas, have invented certain new and useful Improvements in Insertible Saw-Teeth, of which the following is a full, clear, and exact description.

This invention relates to saws having attachable and detachable teeth held to their places by locking plates or keys inserted, like the teeth, within recesses in the saw-plate; and it consists in a novel construction of the parts, also in combining with the same a spring-bolt, whereby each tooth and its locking-key are securely held in position, with facility for detachment when required, and whereby, also, any drawing action, in cutting of the wood on the tooth, tightens the attachment of the tooth, substantially as hereinafter described.

Reference is to be had to the accompanying drawings, forming part of this specification, in which similar letters of reference indicate corresponding parts in all the figures.

Figure 1:
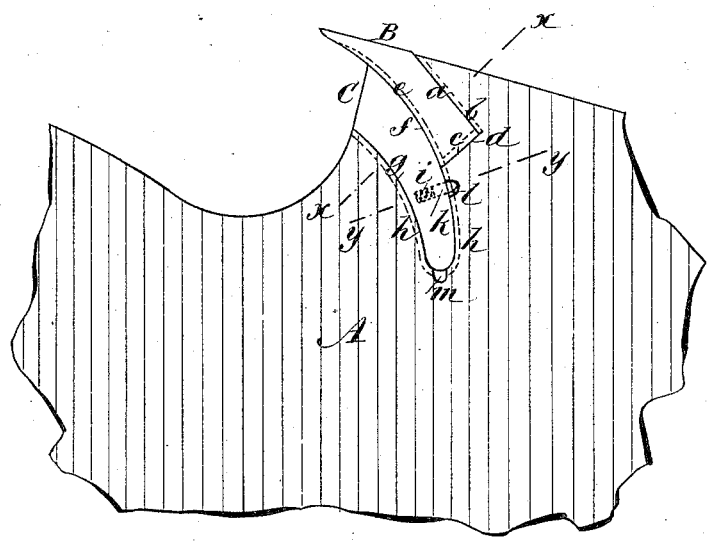
Figure 2:
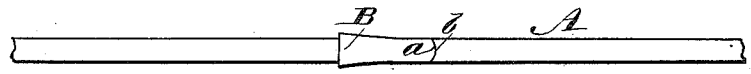
Figure 3:
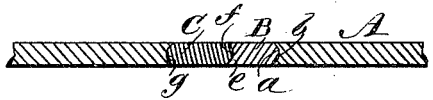
Figure 4:

Figure 1 represents a piece or section of a saw-blade with my invention applied. Fig. 2 is an edge view of the same; Fig. 3, a section thereof on the line $x$ $x$ in Fig. 1, and Fig. 4 a section on the line $y$ $y$ in Fig. 1.

A is the saw-blade, and B one of its insertible teeth, and C the plate-like key or wedge for holding the tooth in place. The several teeth may be set to have any desired pitch, the means for inserting and securing them in no wise restricting or affecting the pitch. The saw-blade A is suitably recessed from its outer edge inward to receive the tooth B and its key C. The back edge, $a$, of the tooth B is straight in direction of its length, but convex transversely, and fits a correspondingly longitudinally-straight and transversely-concave back margin, $b$, of the recess in the saw-plate. The inner end, $c$, of the tooth is also square or straight in direction of its length and concave in its transverse section to fit a correspondingly straight and convex inner end margin, $d$, of the recess in the saw-plate. Said tooth B is of greater width at its inner end than at its center, or intermediately of its length, to give it a dovetail lock or hold in connection with its holding-key C, and its front longitudinal edge, $e$, is concave in direction of its length, also concave transversely to receive within and along it the back edge, $f$, of the key C, which key diminishes in width inward, and is longitudinally of convex form on its back edge and concave form on its forward edge, $g$, and of convex form transversely of its edges to fit the longitudinal front edge, $e$, of the tooth, as described, and the edges of a deeper portion, $h$, of the recess in the saw-plate of transversely-concave configuration, said key and portion $h$ of the recess extending any desired distance inward beyond the inner end of the tooth. A hole running in direction of the width of the key is drilled in the key from its back edge, in which hole is inserted a spiral spring, $i$, and pin or bolt $k$, that is forced outward by the spring. This spring-bolt, when the key C is in place, shoots into and engages with a notch, $l$, in the saw-plate A, to lock the key and prevent it from working out. When required to take the key out for the purpose of removing the tooth, an awl or any other suitable tool is inserted in the notch $l$, to force inward the spring-bolt, and a similar or other suitable tool is inserted in a hole or recess, $m$, in the saw-plate at the inner end of the key to start the key out. The whole construction forms a very secure and convenient one, and by the convex and concave shape of the edges of the tooth of the key, and of the recess in which the tooth and key fit, both the tooth and key are restrained from working out laterally, while the expanded inner end of both keeps the tooth from working out longitudinally, and any drawing action of the tooth in cutting forces the tooth against the key and makes it bind or hold tighter.

Having thus described my invention, I claim as new and desire to secure by Letters Patent—

1. In saws having insertible teeth, the tooth B, of increased width at its inner end, of concave form longitudinally on its front edge, and of convex and concave shape transversely on its edges, in combination with the tapering curved elongated key C, of convex form transversely on its edges, and the saw-plate A, provided with a recess of varying depth and of convex and concave shape on its edges, to receive the tooth and elongated key within it, substantially as specified.

2. In saws having insertible teeth secured in place by a key or wedge, the combination, with each or either insertible tooth, the key or wedge holding said tooth, and the saw-plate recessed to receive the tooth and key within it, of a spring-bolt arranged to engage the key with the plate, essentially as specified.

3. The combination of the tooth B, made of increasing width at its inner end, the elongated curved key C, of tapering form in direction of its width, the saw-plate A receiving said tooth and key within it, and having a notch, $l$, in one of its edges, and the spring and bolt $i\ k$, arranged within the key, substantially as shown and described.

PHILIP V. CONOVER.

Witnesses:
    JNO. A. BAKER,
    F. M. DOWNS.